W. L. STANDISH.

MACHINE FOR CUTTING BUNGS.

No. 7,843. Reissued Aug. 14, 1877.

WITNESSES
James L. Kay
Tom H. Bakewell

INVENTOR
William L. Standish
by Bakewell & Kerr
Attys

N. PETERS, PHOTO-LITHOGRAPHER, WASHINGTON, D. C.

UNITED STATES PATENT OFFICE.

WILLIAM L. STANDISH, OF PITTSBURG, PENNSYLVANIA.

IMPROVEMENT IN MACHINES FOR CUTTING BUNGS.

Specification forming part of Letters Patent No. 67,079, dated July 23, 1867; Reissue No. 7,843, dated August 14, 1877; application filed July 28, 1874.

*To all whom it may concern:*

Be it known that I, WILLIAM L. STANDISH, of Pittsburg, in the county of Allegheny and State of Pennsylvania, have invented a new and useful Improvement in Machines for Cutting Bungs; and I do hereby declare the following to be a full, clear, and exact description thereof, reference being had to the accompanying drawing, forming part of this specification, in which—

Figure 1:
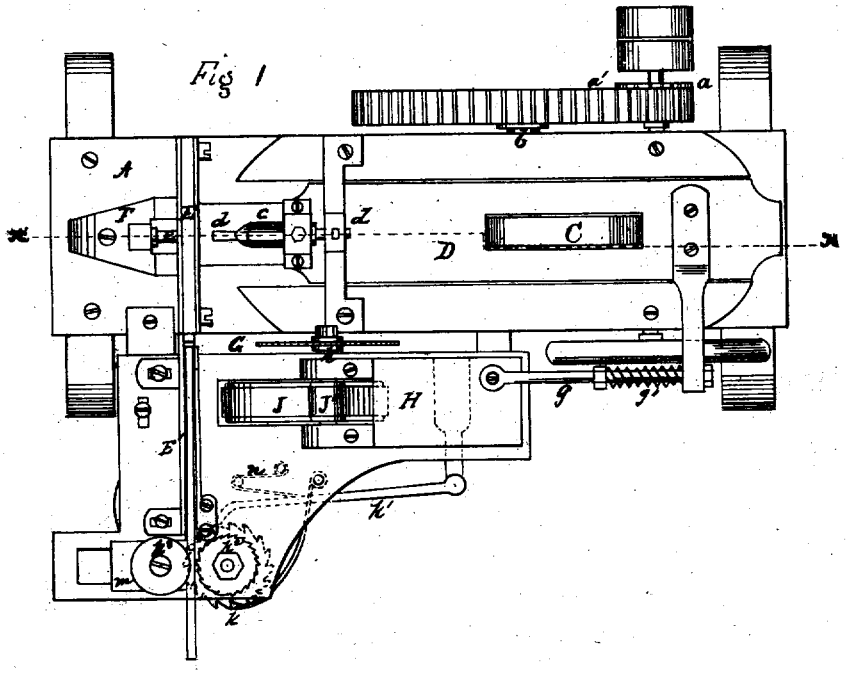
Figure 2:
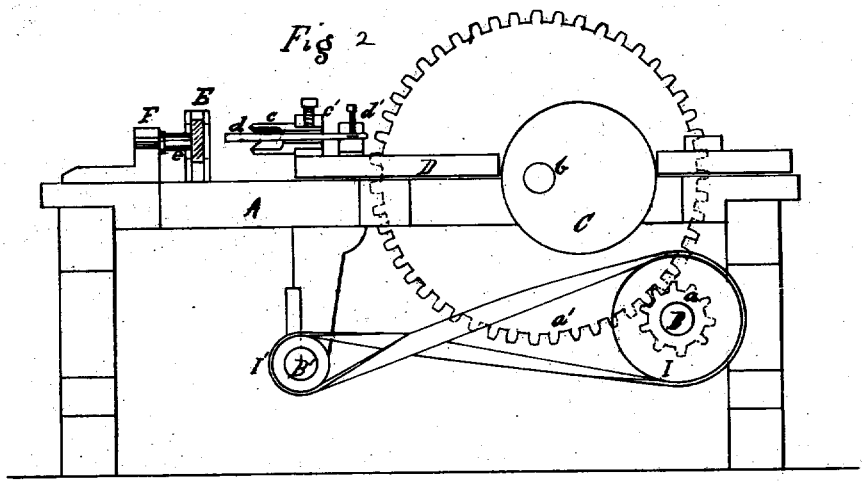

Figure 1 is a plan of my improved combined automatic machinery for cutting and compressing bungs, plugs, taps, &c. Fig. 2 is a vertical longitudinal section, taken in the line *x x*, Fig. 1.

Similar letters of reference indicate like parts.

My invention relates to that class of apparatus employed for making bungs, plugs, taps, &c., for barrels and other purposes; and it consists in a hollow cutter, having projecting points or lips, so as to cut gradually, thereby avoiding the fracture or breaking of the block; in giving to the bore or inside of said cutter a taper for compressing and tapering the bung during the operation of cutting; in a round die or plunger placed in such relation to the guide-box as to steady and sustain the block from which the bung is cut under the thrust of the cutter, said plunger also acting with the cutter in giving the taper to the bung; in combining with the cutter a guide-pin for centering and discharging the bung or plug; in combining with the cutter a guide-box or channel for presenting the block to the cutter; and in combining with the guide-box and cutter a saw for cutting the blocks which are presented successively to the hollow cutter, and from which the bungs are cut.

A is a frame for supporting the machinery. B is the driving-shaft, actuated by steam or other power, and provided with a fly-wheel, on one end of which shaft is a pinion, *a*, engaging a large spur-wheel, *a'*, placed on the upper shaft *b*, that carries an eccentric, C, for moving the main slide D on the top of the frame, with the cutter *c* fixed at one end and made fast to the cutter-head *c'* by a set-screw. The cutter *c* is made hollow, preferably of one piece of steel bored out, with projecting points or lips, to cut gradually and prevent the fracture or splitting of the blocks, and they are made with a sharp or beveled edge.

The back end of the bore is made tapering or cupped, to give the proper taper shape to the bungs, &c., by compression. A guide-pin, *d*, passes through the cutter, and is made fast at the rear end to a cross-bar, *d'*, fixed on the frame. The front end extends nearly to a guide-box or channel, E, in the side of which, opposite the end of the cutter, is an opening through which the cutter passes to cut the blocks in the box, which are backed by the flat face of a round die or plunger, *e*, set in a chuck, F, which the cutter passes over, and which is set on the frame to bear against the bung when it is cut, and force it into the hollow of the cutter for the purpose of compressing the point in a taper form. The guide-box E receives and guides the blocks successively in front of the cutter *c*, after they have been cut from a strip of wood by the circular saw G, on the arbor *h*, which is hung in a sliding frame, H, connected by the rod *g* with the main slide D, and actuated by a pulley, I, on the driving-shaft B, belted to the pulley I' on a counter-shaft, B', that drives a pulley, J, belted to a small pulley, J', on the saw-arbor *h*, as seen in Fig. 1. The connecting-rod *g* is provided with a spiral spring, *g'*, to guard the saw against accident in case of the belt slipping or breaking, and the rod *g* is made adjustable by a screw on the end to regulate the reciprocating movement of the slide with the saw. The strip of wood is fed by a ratchet-wheel, *k*, placed under the bed-frame, worked by a pawl, $k^1$, connected with the saw slide-frame H, and borne into the teeth of the ratchet-wheel by a spring, *n*, and the strip passes between two feed-rolls, $k^2$ $k^3$, on the upper side of the bed, one of which rolls, $k^2$, is on the arbor of the ratchet-wheel, while the feed-roll $k^3$ is pivoted on a slide, *m*, that draws it up by means of a weight and pulley below the bed, to press against the strip of wood and bear it upon the feed-wheel $k^2$, but a spring may be employed for the same purpose. Between the feed-rolls and the guide-box E is a guideway, E', for the strip of wood to pass through in front of the saw, to be cut into blocks, which are pushed on into the guide-box, to be cut by the cutter into bungs.

The operation is manifest. The strip of wood is moved up by the ratchet-wheel the proper distance for cutting off a block by the saw, which comes up to the work with the slide H, when the main slide D moves back after the cutter *c* has cut the bung by the forward movement of the slide, actuated by the eccentric C. The bung, plug, or tap, when cut, remains in the hollow cutter, and is withdrawn by it from the guide-box E until it strikes the end of the guide-pin *d*, which then pushes it out and discharges it finished.

Having described my invention, I claim as new, and desire to secure by Letters Patent—

1. The hollow reciprocating cutter *c*, tapered upon the inside, and having projecting lips or chisel-points, substantially as and for the purpose specified.

2. The die or plunger *e*, in combination with the hollow cutter *c*, substantially as and for the purpose specified.

3. The guide-box or channel E, in combination with the cutter *c* and the die or plunger *e*, substantially as and for the purpose specified.

4. The hollow taper steel-cutter *c*, the guide-pin *d*, the guide-box E, and the die *e*, combined and operating substantially as and for the purposes herein described.

5. The combination of the saw G and the sliding frame H and D, substantially as and for the purpose herein specified.

6. The ratchet-wheel $k$ and pawl $k^1$, in combination with the feed-rolls $k^2$ $k^3$ and the slide frame H, substantially as and for the purpose specified.

7. The combination of the hollow cutter *c*, the guide-pin *d*, the guide-box E, the die *e*, the saw G, the ratchet $k$, the feed-rolls $k^2$ $k^3$, and the slides D and H, substantially as described, for cutting blocks and pointing or tapering the ends of bungs, plugs, or taps, in the manner specified.

In witness whereof I, the said WILLIAM L. STANDISH, have hereunto set my hand.

W. L. STANDISH.

Witnesses:

A. S. MILICE,

P. L. RUNYAN, Jr.